United States Patent
Carter (10) Patent No.: US 6,934,688 B2
(45) Date of Patent: Aug. 23, 2005

(54) SYSTEM, METHOD, AND COMPUTER PROGRAM FOR MANAGING STORAGE AND DISTRIBUTION OF MONEY TILLS

(75) Inventor: Odie Kenneth Carter, Lake Quivira, KS (US)

(73) Assignee: Balance Innovations, LLC, Lenexa, KS (US)

( * ) Notice: Subject to any disclaimer, the term of this patent is extended or adjusted under 35 U.S.C. 154(b) by 913 days.

(21) Appl. No.: 09/731,361

(22) Filed: Dec. 6, 2000

(65) Prior Publication Data

US 2001/0032118 A1 Oct. 18, 2001

Related U.S. Application Data

(60) Provisional application No. 60/169,230, filed on Dec. 6, 1999.

(51) Int. Cl.$^7$ .............................................. G06F 17/60
(52) U.S. Cl. ............................ 705/11; 705/16; 235/7; 235/382
(58) Field of Search ............................... 705/11; 235/7, 235/22

(56) References Cited

U.S. PATENT DOCUMENTS

| | | | |
|---|---|---|---|
| 4,319,326 A | 3/1982 | Uchida | |
| 4,447,885 A | 5/1984 | Biss | |
| 4,495,627 A | 1/1985 | Nishimura | |
| 4,512,428 A | 4/1985 | Bullivant | |
| 4,522,275 A | 6/1985 | Anderson | |
| 4,532,641 A | 7/1985 | Nishimura | |
| 4,646,767 A | 3/1987 | Hikita | |
| 4,674,060 A | 6/1987 | Larkin | |
| 4,682,228 A | 7/1987 | Ando | |
| 4,752,874 A * | 6/1988 | Meyers | 705/18 |
| 4,839,505 A * | 6/1989 | Bradt et al. | 235/381 |
| 4,868,489 A | 9/1989 | Kowalski | |

(Continued)

FOREIGN PATENT DOCUMENTS

| | | | | |
|---|---|---|---|---|
| DE | 19528250 A1 * | 2/1997 | | G07F/17/10 |
| FR | 2586840 | 3/1997 | | |
| GB | 2269088 A | 2/1994 | | |

*Primary Examiner*—Tariq R. Hafiz
*Assistant Examiner*—Michael C. Heck
(74) *Attorney, Agent, or Firm*—Spencer Fane Britt & Browne LLP (57) ABSTRACT

An automated management system for monitoring and controlling distribution and storage of money tills, and linking tracking of employee productivity to time in receipt of a till. The system comprises a cabinet, a control panel, and a personal computer. The cabinet is mounted through a wall to provide an interface having a front side accessible from a first area and a rear side accessible from a second area, such as a cash room. The interior cabinet space is divided into till compartments that are accessible from both the front and rear of the cabinet. Tills are loaded and removed from the rear by cash room personnel and from the front by cashiers. The system is operable to anticipate, based upon work schedules, needed till types or amounts; compile and maintain useful associated records, including employee productivity and link to other systems to further improve efficiency.

25 Claims, 9 Drawing Sheets

U.S. PATENT DOCUMENTS

| | | | |
|---|---|---|---|
| 4,967,576 A | * 11/1990 | Warfman | 70/63 |
| 5,040,227 A | 8/1991 | Lyke | |
| 5,126,732 A | * 6/1992 | Mardon | 340/5.33 |
| 5,128,862 A | 7/1992 | Mueller | |
| 5,193,629 A | 3/1993 | Lare | |
| 5,227,966 A | 7/1993 | Ichiba | |
| 5,308,120 A | 5/1994 | Thompson | |
| 5,366,404 A | 11/1994 | Jones | |
| 5,396,417 A | 3/1995 | Burks | |
| 5,397,264 A | 3/1995 | Gross | |
| 5,564,546 A | 10/1996 | Molbak | |
| 5,756,977 A | 5/1998 | Biss | |
| 5,805,456 A | 9/1998 | Higham | |
| 5,813,510 A | 9/1998 | Rademacher | |
| 5,830,054 A | 11/1998 | Petri | |
| 5,909,794 A | 6/1999 | Molbak | |
| 5,913,399 A | 6/1999 | Takemoto | |
| 5,943,655 A | 8/1999 | Jacobson | |
| 5,944,162 A | 8/1999 | Filiberti | |
| 5,947,257 A | 9/1999 | Schwartz | |
| 5,954,576 A | 9/1999 | Coulter | |
| 6,047,808 A | 4/2000 | Neubarth | |
| 6,067,530 A | 5/2000 | Brooks | |
| 6,109,774 A | 8/2000 | Holmes | |
| 6,196,913 B1 | 3/2001 | Gelb | |
| 6,328,149 B1 | 12/2001 | Blad | |
| 6,494,776 B1 | 12/2002 | Molbak | |
| 6,520,308 B1 | 2/2003 | Martin | |
| 6,772,941 B1 | 8/2004 | Carter | |
| 2004/0181481 A1 | 9/2004 | Carter | |

* cited by examiner

```
Cashier List – All
10/26/00                           8:30:58

|Till Type Key|
|1 = Checker  |
|2 = Express  |
|3 = Cust Serv|
|4 = Bakery   |
|5 = Floral   |
|6 = Pharmacy |
|7 = Funds    |

#    Name              Till Types
100  John Smith        1
101  *Jane Simpson     2
102  *Dale York        3
103  *Mary White       4
104  Sarah Johnson     5
105  *Steve Bowman     6
106  Carrie Burrton    7
107  *Jeffrey Littleton 12
108  Vera Falcrest     123
109  Kristen Johnson   12 45
110  Jack Franklin     12345 7
111  Tricia McLaughlin 12    7
```

FIG. 14.

```
Funds Drawer Activity – Chronological
10/26/00                           8:29:30

Activity on: 10/26/2000

#    Name
     Accessed  Completed  Elapsed

106  Carrie Burton
     8:27:36   8:27:42    0:00:06
106  Carrie Burrton
     8:28:22   8:28:44    0:00:22
111  Tricia McLaughlin
     8:29:05   8:29:20    0:00:15
```

FIG. 15.

```
Drop Activity
10/26/00                           8:29:36

Activity on: 10/26/2000

Accessed   Completed   Elapsed

SYSTEM, METHOD, AND COMPUTER PROGRAM FOR MANAGING STORAGE AND DISTRIBUTION OF MONEY TILLS

RELATED APPLICATIONS

The present application relates to and claims priority with regard to all common subject matter of provisional patent application titled "Controlled Access Storage Terminal", Ser. No. 60/169,230, filed Dec. 6, 1999. The identified provisional patent application is hereby incorporated into the present application by reference.

MICROFICHE APPENDIX

A microfiche appendix containing the source code of a preferred embodiment of the computer program of the present invention is appended hereto consisting of five (5) sheets of microfiche containing a total of three hundred and forty (340) frames, and is incorporated into this application as if fully set forth herein.

BACKGROUND OF THE INVENTION

1. Field of the Invention

The present invention relates to systems for managing the storage and distribution of money tills. More particularly, the invention relates to a computer-controlled system for efficiently monitoring and managing the receipt, dispensation, and secure storage of money tills, and for recording and providing related data for subsequent analysis.

2. Description of the Prior Art

Grocery stores and other retail and wholesale establishments often use cash registers and money tills to facilitate cash sales and other transactions. These cash registers are operated by cashiers who are accountable for the associated money till, typically receiving a "clean" money till at the start of work and returning a "dirty" till when finished, and being required to secure the till during breaks or other events requiring the cashier's absence from the cash register. Those with ordinary skill in the art will appreciate that it is desirable to closely manage the storage and distribution of the money tills. This is particularly true, for example, for larger businesses having a number of cashiers receiving and returning tills of varying types during the workday. It is further desirable to maintain records related to the management of the tills, including, for example, the number of times each employee received and deposited a particular till or till type and the amount of time each employee was in receipt thereof.

Currently, at least one additional employee, typically a manager or other supervisor, must be involved in receiving and dispensing tills to provide access to the cash office or other storage area and to record the transaction. This can create substantial and costly inefficiency, particularly where the second employee has additional duties and the cashier must wait to receive or turn in a till. Also, unnecessary risks are created because the cashier waiting with an exposed till is a particularly vulnerable target for thieves. Furthermore, such frequent opening of the cash office to perform till transactions jeopardizes security and control of the cash kept therein.

Additionally, it is well-known in the art that great potential for abuse exists in traditional employee time-keeping systems and methods where employees are asked to police themselves and keep accurate records of their own work start, work stop, and break times. For example, a cashier preparing for a break might be tempted, after turning in his or her till, to use the restroom, purchase a snack or drink, and walk to the break area before considering the break to have begun. Likewise, the employee might wait to use the restroom or wash their hands after considering the break to have ended but before retrieving the till. The difference between the time allowed for break and the time actually taken between turning in and retrieving the till represents time and money lost by the employer. Furthermore, though it is desirable to be aware of and maintain historical records of employees' productive time, no objective or reliable system, other than traditional time-card-based systems, exists for distinguishing productive time from wasted time or identifying abuse.

Because existing till management and time-tracking systems allow for or create inefficiency, increased theft risks, and employee abuse, a need exists for an improved till management system, preferably incorporating an ability to objectively and reliably track employee productivity.

SUMMARY OF THE INVENTION

The present invention solves the above-described and other problems and provides a distinct advance in the art of till management systems and techniques. More specifically, the present invention is a computer-based system for monitoring and managing the storage and distribution of money tills, and for recording and storing related till management information for subsequent recall and analysis. The system is able to reduce the number of employees involved in till exchanges, reduce the amount of time wasted waiting to receive or return tills, reduce till exposure time and associated theft and loss risks, and reduce the potential for employee abuse of time-tracking.

The preferred system broadly comprises one or more cabinets, a control panel, and a personal computer. The cabinets may be substantially identical, each being mounted through a wall so as to provide an interface having a front portion accessible from a first area, such as a work area, and a rear portion accessible from a second area, such as a cash room. The interior cabinet space is divided into a plurality of till compartments, with each being accessible from the front and rear of the cabinet. Frontal access to each compartment is regulated by a computer-controlled door. New or "clean" tills are loaded into the compartments from the rear; used or "dirty" tills are returned to the cabinet from the front. Each cabinet is linked by sensors to the computer in order to monitor, manage, and track compartment status and access.

The control panel is mounted near the front portion of the cabinet. A cashier requiring a till identifies him or herself at the control panel using a keypad or other device, possibly including a magnetic card reader or biometric identification device, such as a fingerprint reader or retina scanner, or other data capture device. The entered information is sent to the computer to which the control panel is linked. The control panel is further operable to display information and print messages.

The computer receives the identification and password information and matches it to employee information, including compartment and till authorization information, stored in a database. The computer is thus able to match the particular cashier with a particular till in a particular compartment. The computer records the time and other relevant information and opens the appropriate door to allow the cashier to take the till stored therein. When the cashier returns the till, a similar process occurs.

Because till distribution is substantially automated, the present invention greatly increases efficiency and eliminates wasted employee time. Managers or other cash office personnel are able to load the cabinet at their convenience and in anticipation of need as determined, for example, from cashier work schedules. Cashiers are able to receive and return tills without waiting for a manager to finish other work. Furthermore, there is no need to delegate a human operator to actively monitor the system. Instead, when a requested till type is unavailable, or when the computer anticipates, based on work schedules, that an unloaded till type will be needed, a page or other signal can be sent by the computer to notify the proper personnel.

By using a computer to monitor and manage till storage and distribution, the present invention is able to compile and maintain useful related records, including the amount of each employee's productive time (i.e., time in possession of a till). This provides an objective measure for employee time-tracking which does not rely on the employee other than to receive and return tills as necessary.

To further improve efficiency, the present system may be linked to various other systems, such as, for example, the commonly used Point-of-Sale (POS) system, and the Veri-Cash system (described in non-provisional application titled "Revenue Balancing Method and Computer Program", Ser. No. 09/616,401, filed Jul. 7, 2000). Linking to the POS system allows the computer to monitor, among other things, the time a cashier uses between leaving the register and returning the till. Linking to the Veri-Cash system allows for faster loading of clean tills and unloading and balancing of dirty tills.

These and other novel features of the present invention are described in more detail in the section titled DETAILED DESCRIPTION OF A PREFERRED EMBODIMENT, below.

BRIEF DESCRIPTION OF THE DRAWING FIGURES

The present invention is described in detail below with reference to the attached drawing figures, wherein.

DETAILED DESCRIPTION OF A PREFERRED EMBODIMENT SYSTEM AND COMPUTER PROGRAM

Figure 1:
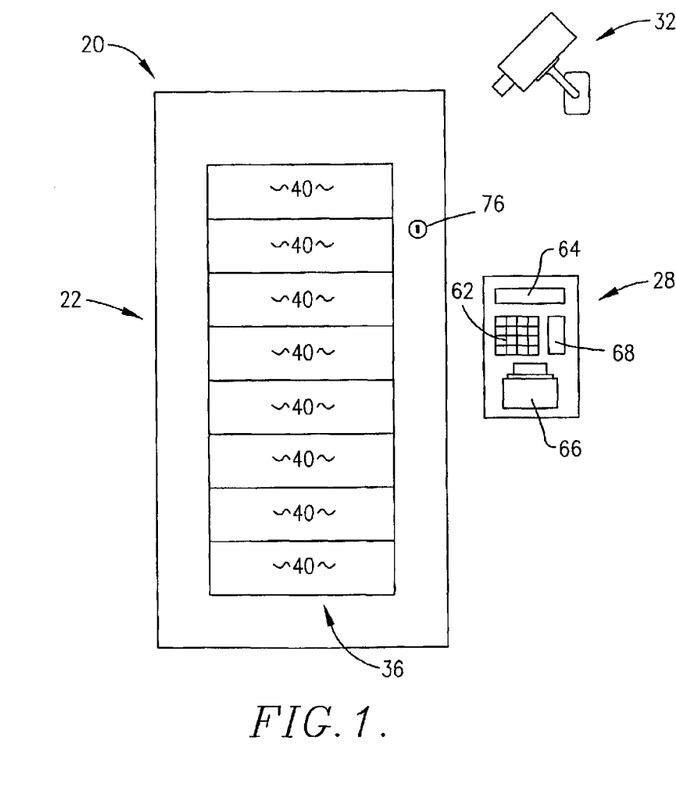
FIG. 1 is a front elevational view of a portion of a preferred embodiment of the system of the present invention.
Figure 2:
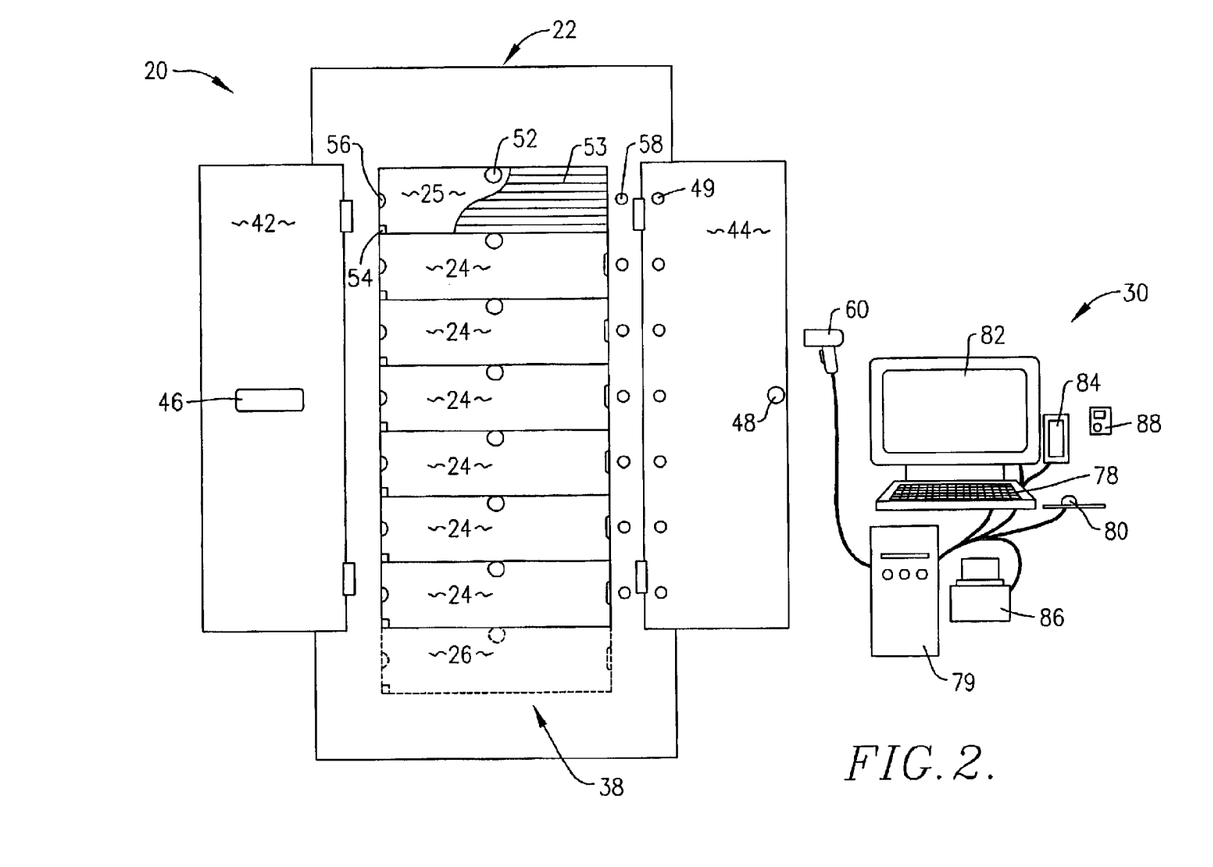
FIG. 2 is a rear elevational view of a portion of a preferred embodiment of the system shown in FIG. 1.
Figure 3:
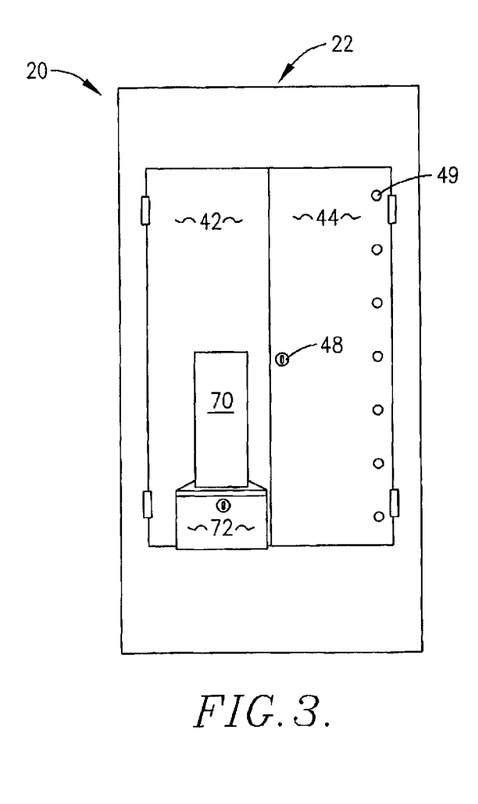
FIG. 3 is a rear elevational view of the cabinet portion shown in FIG. 2 with the panel door closed and the slide and drop box in place.

Referring to FIGS. 1–3, a system 20 is shown constructed in accordance with a preferred embodiment of the present invention and operable to facilitate the monitoring and management of storage and distribution of money tills, and for recording and storing till management information for subsequent recall and analysis. The preferred system 20 broadly comprises at least one cabinet 22 providing a plurality of till compartments 24 and at least one funds compartment 26; a control panel 28; a personal computer 30; and at least one video camera 32.

The cabinet 22 provides a protective housing for the money tills. Though shown as being rectangularly upright, designs may vary and no particular type of housing or cabinet shape or size is essential to the present invention. The cabinet 22 is constructed of steel or similar suitably durable material, and is preferably mounted through a wall so as to provide an interface presenting a front portion (FIG. 1) to a first area or room and a rear portion (FIG. 2) to a cash room or office. In another embodiment (not shown), the cabinet is a free-standing device, possibly having wheels for easier relocation. The system 20 may be easily expanded by adding more cabinets, each coupled with and managed by the one control panel 28 and personal computer 30.

The interior of the cabinet 22 is divided so as to define the till compartments 24. The front of the cabinet 22 presents a front opening 36 for accessing the compartments 24. The cabinet 22 includes a plurality of hingedly-mounted doors 40, with each door 40 operable to securely close the front of a corresponding compartment 24 and to thereby allow only selective, controlled access to that compartment 24 via the front of the cabinet 22. Though normally controlled by the computer 30, the doors 40 are manually openable by a locking/unlocking mechanism 76 in the event of a power outage or other disruption in computer control.

The rear of the cabinet 22 presents a rear opening 38 for accessing the compartments 24. The cabinet 22 includes two hingedly-mounted panel doors 42,44 operable together to securely close the rear access opening 38 to all of the compartments 24. Holes 49 are included in one of the panel doors 44 to accommodate and allow for the viewing of telltale light emitting diodes (LED) 58, as described below. A locking mechanism 48 allows the rear panel doors 42,44 to be secured. When desired, the panel doors 42,44 may be lifted off their respective hinges and set aside or otherwise stored.

One of the panel doors 42 also includes a drop slot 46 for allowing deposits to pass therethrough when the door 42 is closed. A slide or chute 70 may be attached to the drop slot 46 to guide such deposits into a drop box 72. The drop function is discussed in greater detail below.

The compartments 24 provide managed, controlled-access storage spaces for the money tills. The number, size, and shape of the compartments 24 are matters of design, though minimum compartment dimensions are limited by the size and shape of the tills to be received therein. The number of compartments 24 should reasonably accommodate the expected rate of till exchange, the variety of till types used, and the number of desired special purpose compartments.

At least one compartment 25 is operable to provide an exclusive access, storage-only compartment including an articulated roll-down door 53 operable to selectively restrict access via the rear opening 38 to the compartment 25. The articulated door 53 is shown in FIG. 2 in broken view to allow the viewer to see the various compartment components 52,54,56 otherwise concealed behind the closed door 53. The storage-only compartment 25 and articulated door 53 provides employees the ability to park dirty tills for subsequent retrieval without exposing the till, for which the employee is still responsible, to tampering via the rear opening 38. When the door 53 is not closed, and the compartment 25 not designated special storage-only status, the compartment 25 is treated as any other general purpose compartment 24.

Furthermore, one of the compartments 24, though physically identical to the others, aligns with the drop slot 46 and is designatable in the computer 30 as a "drop compartment" operable to receive deposits of excess funds. This function is useful, for example, at night when it is least desirable or safe to leave excess funds unsecured. The drop compartment is deemed "designatable" because the drop function may be engaged and disengaged as desired. The computer 30 may be configured to automatically designate and undesignate the drop compartment at pre-established times. When the drop compartment is not designated, the compartment functions and is treated normally.

Each compartment 24,25,26 includes a solenoid 52; a door sensor 54; a till detector 56; and a telltale LED 58. The solenoid 52 is electrically actuatable by the computer 30, as described below, to open the door 40.

The door sensor 54 senses the position of the door 40, whether open or closed, and reports such to the computer 30. Once opened, the door 40 must be manually closed. In other embodiments, the door 40 is operable to close automatically after a pre-established period of time. If the door 40 opens unexpectedly, a warning message or alarm is initiated by the computer 30.

The till detector 56 is operable to detect the presence of a till in the compartment 24 and report such to the computer 30. The till detector 56 may be any conventional detection device operable to perform this function, such as, for example, a signal emitter/detector combination. The detector 56 is preferably further operable, however, to determine the type of till present (e.g., checker, express, etc.) and the till's unique tracking number, for example, by reading a bar code affixed to the till, and reporting such to the computer 30. The tracking number provides management with the ability to track custody of each till throughout the work shift, and allows for greater control over accountability of funds, which is particularly useful when discrepancies arise. If a bar code reader is not incorporated into each compartment, then a hand scanner 60 is included in the system, coupled with the computer 30, for use by an operator.

The telltale LED 58 is operable to communicate the status of the compartment 24 and till, and is controlled by the computer 30. An unlit LED 58 indicates an empty compartment 24; a blinking red LED 58 indicates that the corresponding door 40 is open; a blinking green LED 58 indicates that the type of loaded till has not been reported to the computer 30; a green LED 58 indicates a properly loaded till; and a red LED 58 indicates that the compartment 24 contains a dirty till or has a special designation, such as the drop compartment, so no till should be loaded therein. Each LED 58 is mounted on the rear face of the cabinet 22 near its corresponding compartment 24, and is visible, when the panel door 44 is closed, through holes 49 in the door 44.

The funds compartment 26 is a special purpose compartment or slot, preferably the lowest, containing additional funds and change money which may be needed under various circumstances during the work period. Typically, a manager or other supervisor will have exclusive access to and full responsibility for the funds in the funds compartment 26. Unlike the other compartments 24, the funds compartment 26 is not accessible from the rear of the cabinet 22. Instead, funds are loaded and subsequently accessed from the front only, thereby facilitating almost complete transfer of control and accountability.

In contemplated embodiments of the present invention, other special purpose compartments may be designated as required, and are not limited to a single funds 26 and/or drop compartment per cabinet 22.

The control panel 28 provides an interface with the computer 30 for managing access to the compartments 24. The control panel 28 includes a keypad 62; a display 64; and a printer 66. The keypad 62 provides sufficient alphanumeric keys to allow an operator to identify him or herself to the computer 30 using an employee ID number or password or both. A second identification device 68 may be included for accepting, identifying, or validating information in other forms, including, for example, a card reader or a biometric device such as a fingerprint scanner or an optical scanner.

The display 64 and printer 66 are operable to communicate messages and other information to the employee. These messages may include timekeeping data (e.g., till-received time, till-returned time); business-related information, such as daily sale specials or changes in pricing; and personal messages, such as birthday greetings. The personal messages could be specially entered for particular circumstances or automatically generated when certain conditions occur, either in the present system or in a second system interfaced therewith. For example, where an employee retrieves his or her till from the cabinet 22 ten minutes after his or her break period expired, as determined by an interfaced time and attendance system, the computer 30 could cause the printer 66 to print an appropriate message to the employee and an exception report could be prepared for management.

The computer 30 actively manages the storage and distribution of tills from the cabinet 22. The computer 30 is further operable to process and keep related information, including, for example, records regarding the times employees received and returned tills. The computer 30 may be any computing device such as an IBM compatible personal computer, including those manufactured and sold by Dell, Compaq, Gateway, or any other computer manufacturer. The computer 30 includes a central processing unit 79 and is coupled with conventional input devices, such as a keyboard 78 and a computer mouse 80, and conventional output devices, such as a monitor 82, one or more speakers 84, and a printer 86.

The computer 30 further includes a software protection key (not shown) comprising a hardware unit serially attachable to the computer's printer port and containing at least one enabling mechanism. Each time the program is started and periodically while the program is running, the software, described below and included as a microfiche appendix, searches for and establishes communications with the key. If the key is not present or proper communication cannot be established, the software is not enabled and will not operate. If the key is properly present, the software is enabled. Such software protection keys are well-known in the art.

The computer 30 also includes or is able to communicate, directly or indirectly, with a portable electronic signaling device 88, such as a common pager. Inclusion of the signaling device 88 frees employees from having to constantly monitor the system 20 for conditions requiring human attention, such as, for example, where the computer 30 anticipates, based upon work schedules, that a number of tills or till types will be needed which are not currently loaded in the cabinet 22. Instead, the computer 30 is operable and able to signal a remote employee that such a condition has occurred or will occur.

The video camera 32 allows security monitoring and recording of events occurring to or near the front or rear of the cabinet 22. The camera 32 may be coupled with a conventional video cassette recorder (not shown) or the computer 30 to monitor and record events. Furthermore, recordation of events may be continuous or event driven, meaning that the recording function engages only when a particular condition has been satisfied or event has occurred, such as, for example, control panel 28 activity.

A preferred computer program is included as a microfiche appendix for use in conjunction with the above-described preferred system. The program is operable to present and receive information graphically, using multiple viewing windows where practical, as well as audibly or otherwise, depending on the hardware available to it, and to monitor and control various system components, including the sensors 54,56, solenoids 52, and LEDs 58. The computer program may be implemented in any suitable high or low level computer language, such as C++, Java, or Assembly, and stored on any suitable computer readable media accessible to the computer 30, such as CD-ROM or magnetic disk.

Once installed on the computer 30, the program may be started with a command such as "CAST.exe". The program then conducts an automatic initialization phase wherein, for example, it detects the software protection key, transfers required data from one memory device or location to another, sets and formats the monitor display 82, loads any required drivers, and initializes components coupled with the computer 30.

FIGS. 4–15 are screen captures of screens actually generated and displayed by the system 20 and software of the present invention. Each screen capture is of a separate window in the computer display, meaning that a plurality of the windows shown in the screen captures can be displayed on the computer monitor 82 simultaneously.

Figure 4:
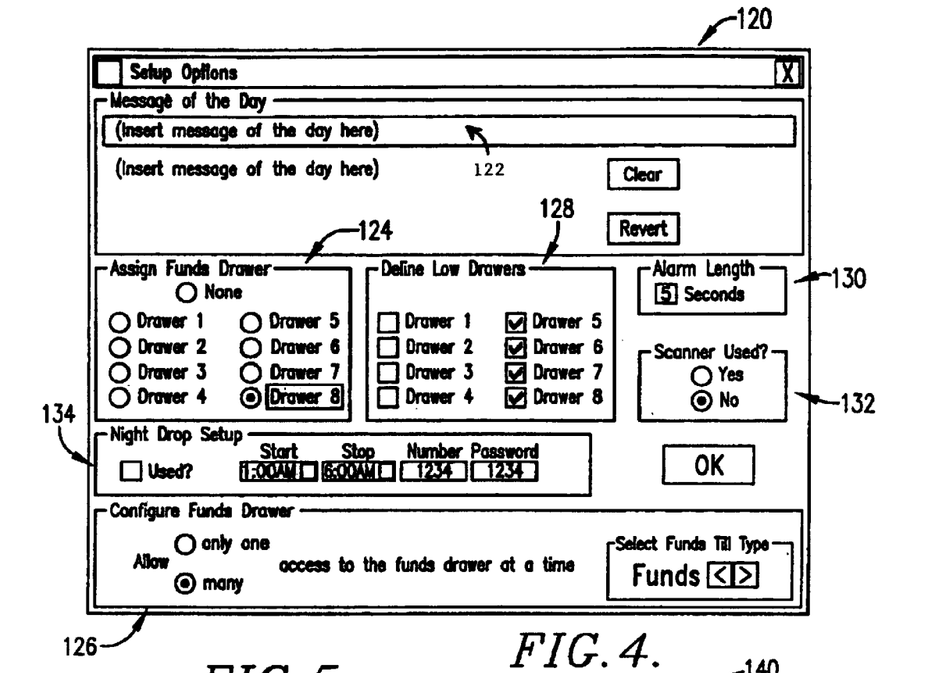
FIG. 4 is a screen capture showing an interactive setup screen generated by a preferred embodiment of the computer program of the present invention.

Prior to an operator using the system 20, the software should be initially configured. Configuration can be changed while the system 20 is in operation. FIG. 4 shows the setup screen 120 comprising a number of fields, including a message field 122; a funds compartment assignment field 124; a funds compartment configuration field 126; a low compartments field 128; an alarm field 130; a scanner field 132; and a night drop field 134. Additional fields may be included as needed to configure or define program and system options.

The message field 122 allows the operator to enter and clear messages or revert to a previous message. As a message is entered, the program automatically wraps the text to fit the text box without truncating words. The message is displayed in the message field 122 as it would appear on the display screen 64 of the control panel 28.

The funds compartment assignment field 124 allows the operator to designate one of the compartments as a funds compartment 26. As described above, the funds compartment 26 is preferably a particular compartment. As can be understood from the setup screen 120, however, none, any one, or many compartments may be designated as funds compartments, as may be desired. If a funds compartment 26 is designated, then the funds compartment configuration field 126 allows the operator to provide or define how many employees will have access to the compartment 26, which till type will be the funds till type, and other relevant information.

The low compartments field 128 allows the operator to define the compartments 24 considered "low". Where employee height information is included in the employee database, the program is able to correlate that data with the low compartment data to, where possible, open lower compartments for shorter employees and higher compartments for taller employees.

The alarm field 130 allows the operator to define the amount of time, preferably between 1 and 30 seconds, an alarm will sound in the event of a forced opening of a compartment door 40. The scanner field 132 allows the operator to indicate whether a hand scanner 60 is to be used to provide compartment and till status information to the program. The night drop field 134 allows the operator to indicate whether a drop compartment will be used, and, if so, between what hours (typically during the night). The night drop field 134 is also used to set the drop compartment password, which is preferably a common password available to any employee who may need to deposit excess cash.

Figure 5:
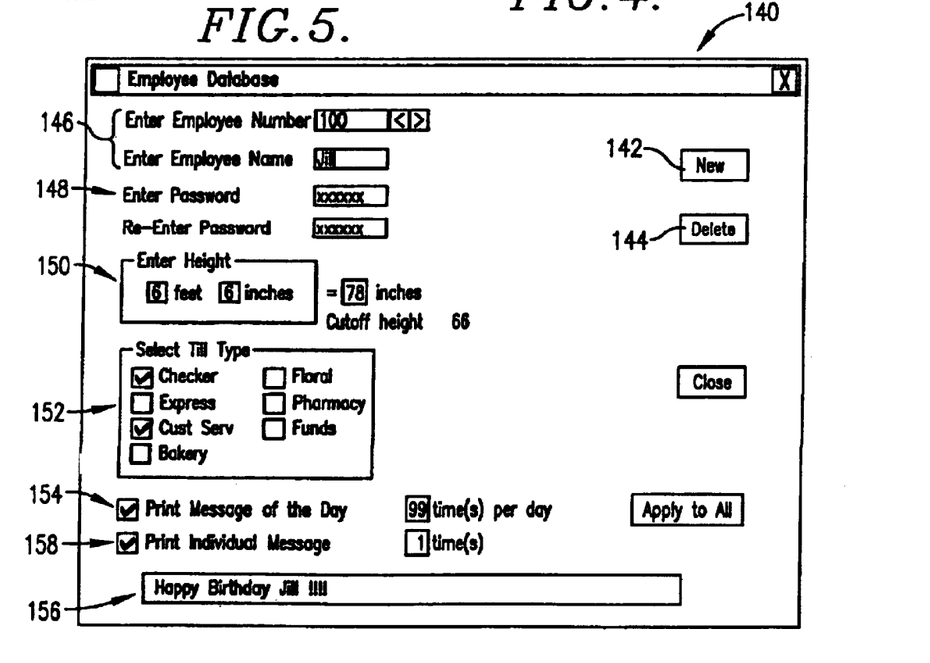
FIG. 5 is a screen capture of a databased employee record screen.

Also prior to using the system 20, an employee database must be populated with relevant employee information. If a particular employee has not been entered into the database, the software will not allow that employee access to the system 20 via the control panel 28. The database may be updated while the system 20 is in operation. FIG. 5 shows the employee database screen 140 comprising a number of buttons and fields, including a new button 142; a delete button 144; number and name fields 146; a password field 148; a height field 150; a till type field 152; a first print field 154; a personal message field 156; and a second print field 158. Additional fields may be added as needed to include other relevant employee information.

The new button 142 creates a new employee record in the database. The delete button 144 deletes an employee's record from the database. When interfaced with other systems, the computer 30 of the present system 20 may automatically update its database based upon one or more databases in the interfaced systems. To prevent loss of entire files, deletions of more than ten employee records requires operator validation. A printable daily report indicates those employees added to or removed from the database that day.

The number and name fields 142 allow the operator to enter the employee's number and name. The password field 148 allows the operator to set a password for the employee. The employee number and password are used by the program to grant or deny access to and track employee use of the system 20.

The height field 150 allows the operator to apprise the program of the employee's height. This information is used in conjunction with the low compartment data entered via the setup screen 120, described above, to match, when possible, employee height with compartment height. This allows the system 20 to conveniently accommodate shorter and taller employees.

The first print field 154 allows the operator to indicate whether the message of the day should be printed by the control panel printer 66 when the particular employee accesses a compartment 24,26 via the control panel 28, and how many times per day (e.g., only upon first access, upon every access, etc.) the message should be printed for the employee. The message was entered via the setup screen 120, described above.

The personal message and second print fields 156,158 allow the operator to enter and enable a personal message, such as "happy birthday", for printing by the control panel printer 66 when the particular employee accesses a compartment via the control panel 28. The operator can set the number of times the personal message should be printed for the employee. This message could also be generated automatically based upon information provided by other interfaced systems.

Once the above-described initialization and setup is complete, the system 20 is operable to manage the storage and distribution of the money tills and communicate related information via the computer 30 and various peripheral equipment.

Figure 6:
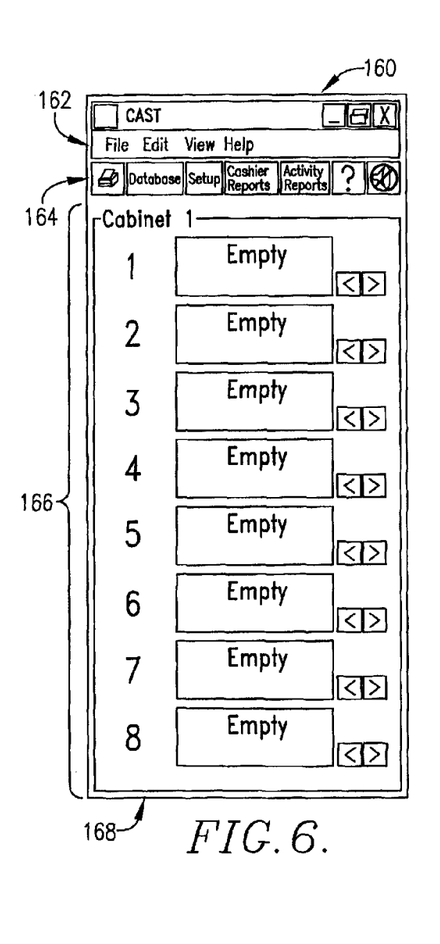
FIG. 6 is a first screen capture of a main menu and interactive graphical interface screen.
Figure 7:
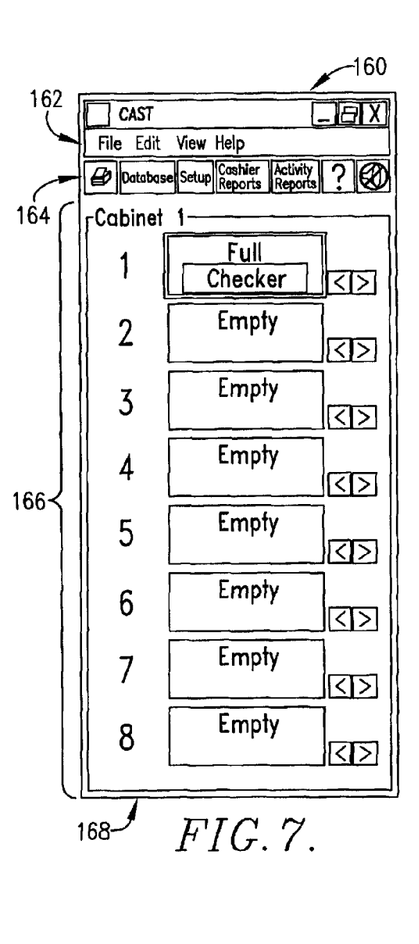
FIG. 7 is a second screen capture of the main menu and interactive graphical interface screen.
Figure 8:
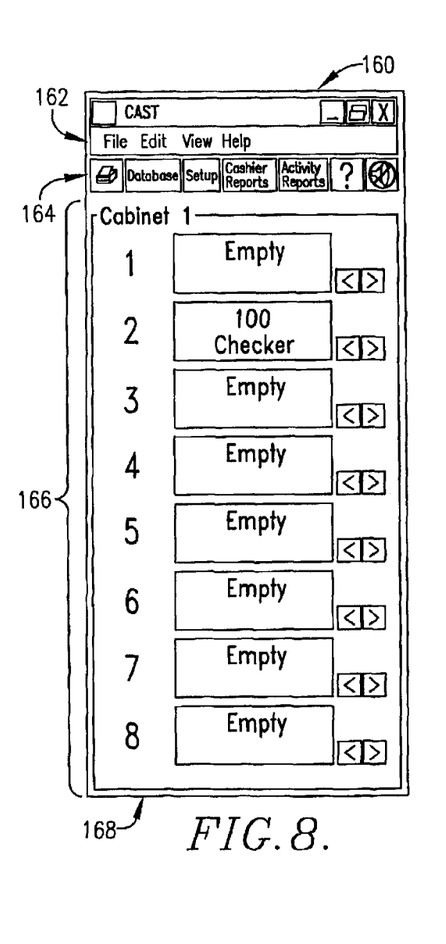
FIG. 8 is a third screen capture of the main menu and interactive graphical interface screen.

FIGS. 6, 7, and 8 show a main menu screen 160 operable to provide selectable, graphical access to other screens, including those described above and below. The main menu screen 160 comprises pull-down menus 162, and function buttons 164, both of which are well-known in the art for providing quick and easy access to other screens and various functions. The main menu screen 160 further includes a graphical interface 166 operable to visually communicate compartment and till status information using pictorial compartment representations, or "boxes" 168, with each such box 168 representing a compartment 24,26.

The program uses text and color to emphasize and communicate status information in each box 168. For example, whether a compartment 24 does or does not contain a till, as determined by the till sensor 56 located in the compartment 24, is communicated via the corresponding box 168 by the words "full" or "empty", respectively (see specifically FIG. 6). Once the program has been apprised of the type of a loaded till, this information will appear in the box 168 as well (see specifically FIG. 7). After an employee has turned in a dirty till, the employee's number will appear in the box 168 along with the till type (see specifically FIG. 8). The box 168 will appear green when no special action is required or condition exists, as, for example, when the corresponding general purpose compartment 24 is empty or holds a clean till. When a compartment 24,26 has a special designation the box will appear black, as, for example, when the compartment 24 has been designated a funds, drop, or unused compartment. When action is required the box 168 will appear red, as, for example, when a dirty till is loaded. Thus, the graphical interface portion 166 of the screen 160 is semi-automatically responsive to changes in compartment and till status based upon the compartment's configuration and relevant sensor and detector information provided to the program.

In operation, the graphical interface works as follows. All boxes 168 initially read "empty" and all but one are green, with the non-green box being designated a drop compartment and appearing as a black box. A clean till is loaded into a compartment 24 (not the drop compartment) causing the corresponding box to read full. No till type is displayed because the program has not yet been provided with till type information for the loaded till. Till type information can be entered by reading an affixed bar code using the hand scanner 60, by entering the information at the computer 30 using the keyboard 78 or mouse 80, or by any other practical means. Once the program has been apprised of the till type, the till type appears in the box 168 (e.g., checker, express, etc.).

Once a cashier has entered their identification and removed the till, the box 168 again reads empty and is green. Once the cashier has returned the till to a compartment 24, the corresponding box 168 turns red and the employee's number and till type are displayed in the box 168, indicating that the till needs to be removed and balanced. If a till balancing system, such as the Veri/Cash system, is used, an operator may enter appropriate information, possibly by scanning bar codes, to prepare the integrated systems for the till balancing function.

Figure 13:
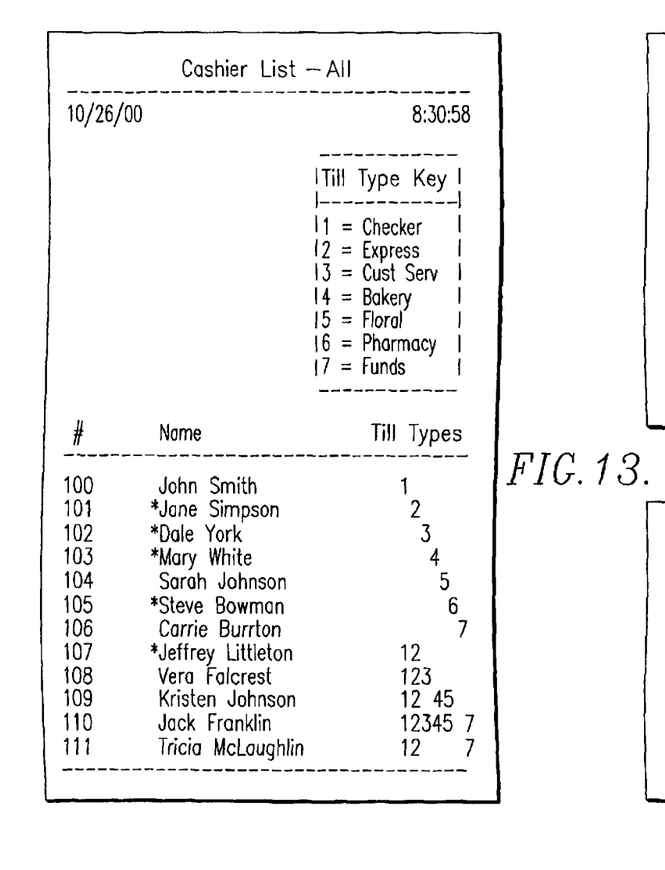
FIG. 13 is a printout communicating the same information as the authorization report screen of FIG. 10.
Figure 14:
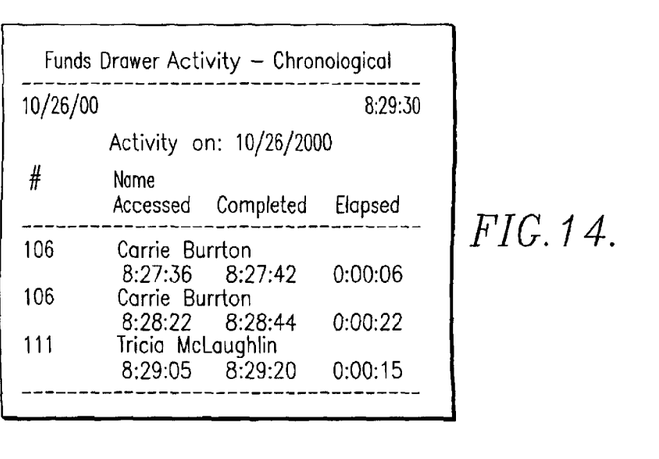
FIG. 14 is a printout communicating the same information as the funds compartment activity report screen of FIG. 12.
Figure 15:
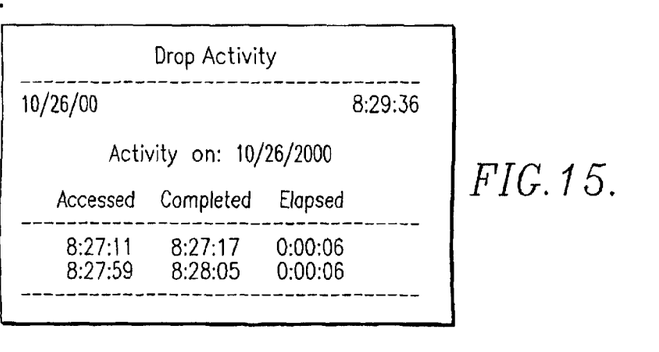
FIG. 15 is a printout communicating information of the daily activity related to a drop compartment.

A tremendous advantage of the present invention is that it allows detailed record-keeping related to till management. Whenever a till is received or returned by an employee, a record is generated of the relevant information, including time in, time out, and the type of till. These records are kept stored in continually updated databases for later recall and analysis. The program is operable to generate several reports based upon such stored information. These reports can also be printed on the printer 86. FIGS. 9–12 show screen captures of these reports as displayed on the computer monitor 82; FIGS. 13–15 show example printouts of the information. All such reports are accessible from a few screens by selecting the menu tab 172 corresponding to the desired report. A print function button 174 is included for convenience.

Figure 9:
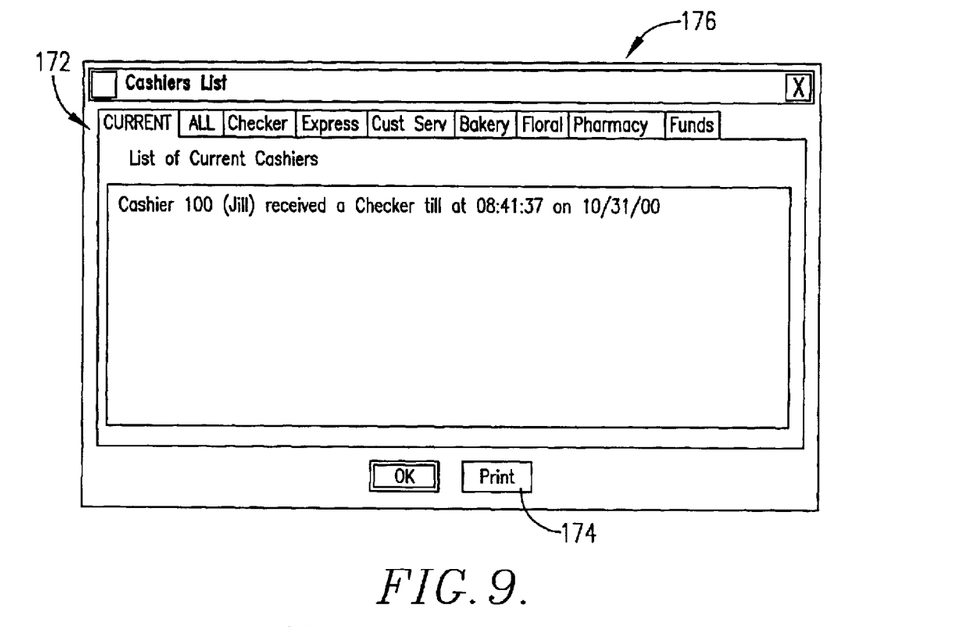
FIG. 9 is a screen capture of a report screen showing all employees currently in receipt of a till.

FIG. 9 shows a current activity screen 176 operable to report a list of employees currently in possession of a till, the type of till, and the time and date the till was received. This particular report is interactive in that the operator is able, from this screen, to change or delete the displayed information.

Figure 10:
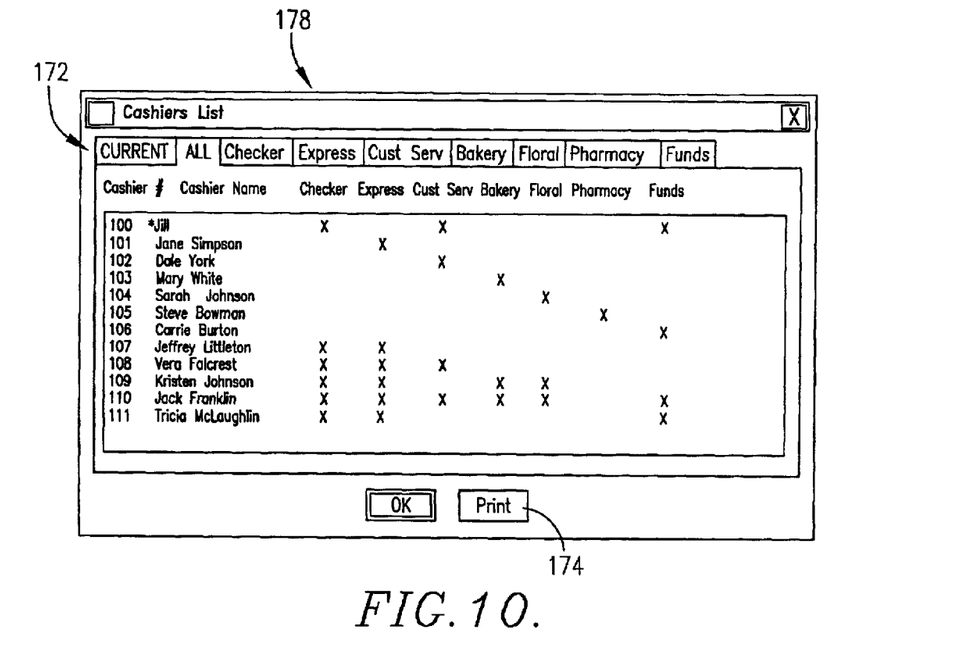
FIG. 10 is a screen capture of an authorization report screen showing the till authorizations of all employees.

FIG. 10 shows an authorization screen 178 operable to report all recorded employees, their numbers, and the till types each is authorized to receive. An asterisk next to a name indicates that the employee is in possession of a till. FIG. 13 shows an example printout of the authorization screen information.

Figure 11:
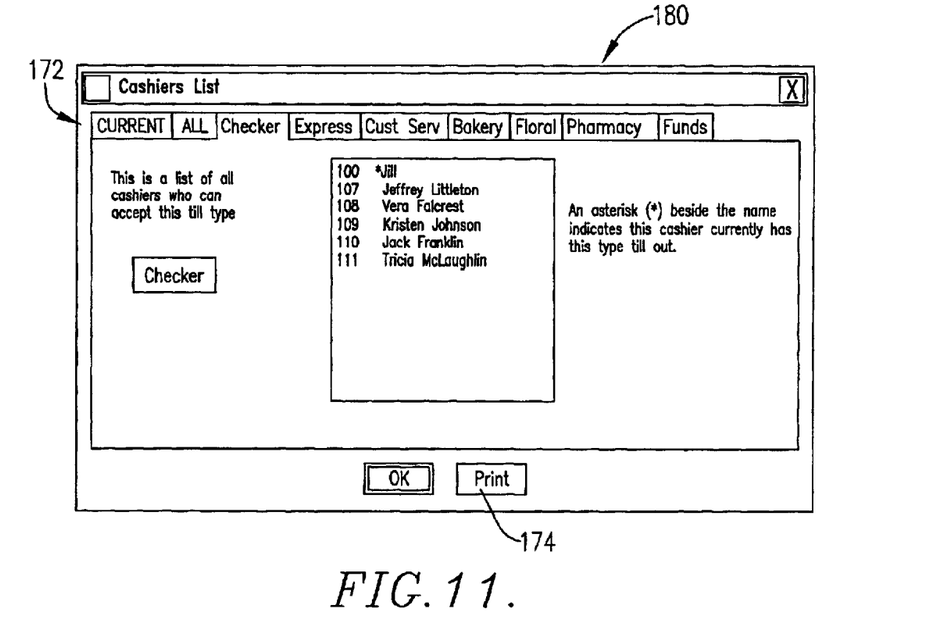
FIG. 11 is a screen capture a till report screen showing all employees authorized to receive the particular type of till to which the report pertains.

FIG. 11 shows a till screen 180 operable to report all employees authorized to receive the particular till type to which the screen relates. An asterisk next to a name indicates that the employee is in possession of a till. A separate till screen 180 exists for each till type.

Figure 12:
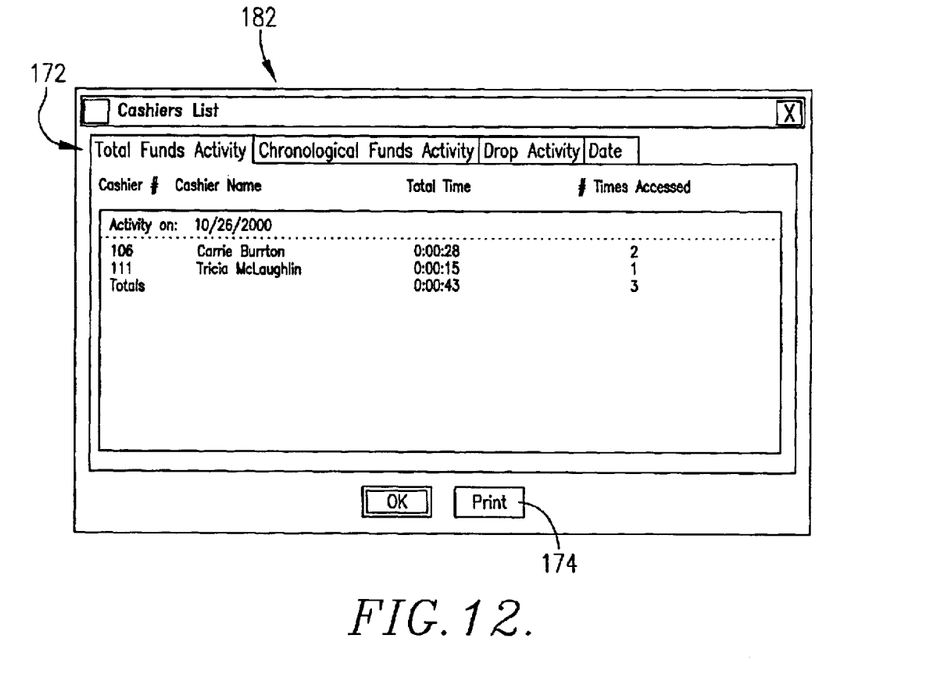
FIG. 12 is a screen capture of a funds compartment activity report screen showing daily activity related to a funds compartment.

FIG. 12 is a funds compartment activity screen 182 operable to report activity relating to the funds compartment 26, including the accessing employees, the total time each employee kept the compartment 26 open, and the number of times each employee accessed the compartment 26. A similar screen (not shown) exists to report drop compartment activity. Each activity screen is operable to display information for the current or previous days as desired and selected from the drop down menu. FIGS. 14 and 15 show examples of printouts of the funds compartment and drop compartment activity records, respectively.

Other screens (not shown) include action-needed screens operable to indicate that a special action is required, such as restocking paper in a printer; reset screens operable to indicate that a daily reset of certain fields or information has occurred; and various help screens for providing interactive assistance to system operators. As will be appreciated by those with skill in the art, various other interactive, information, database, report, and activity screens may be desirable depending upon particular applications. Such screens are easily added using well-known programming techniques to supplement the abilities of the present invention.

The program may be easily adapted for use with other systems and software, such as, for example, an employee time and attendance system, a labor scheduling system, a POS system, or a till balancing system. By integrating such systems a complete picture of the work environment can be developed, which facilitates maximizing efficiency. For example, while an employee's log-on and log-off times from a register are recorded by the POS system, their till check-out and return times are recorded by the present invention. Integrating these systems and comparing the differences in times will allow employers to spot costly time-tracking abuses.

Figure 16:
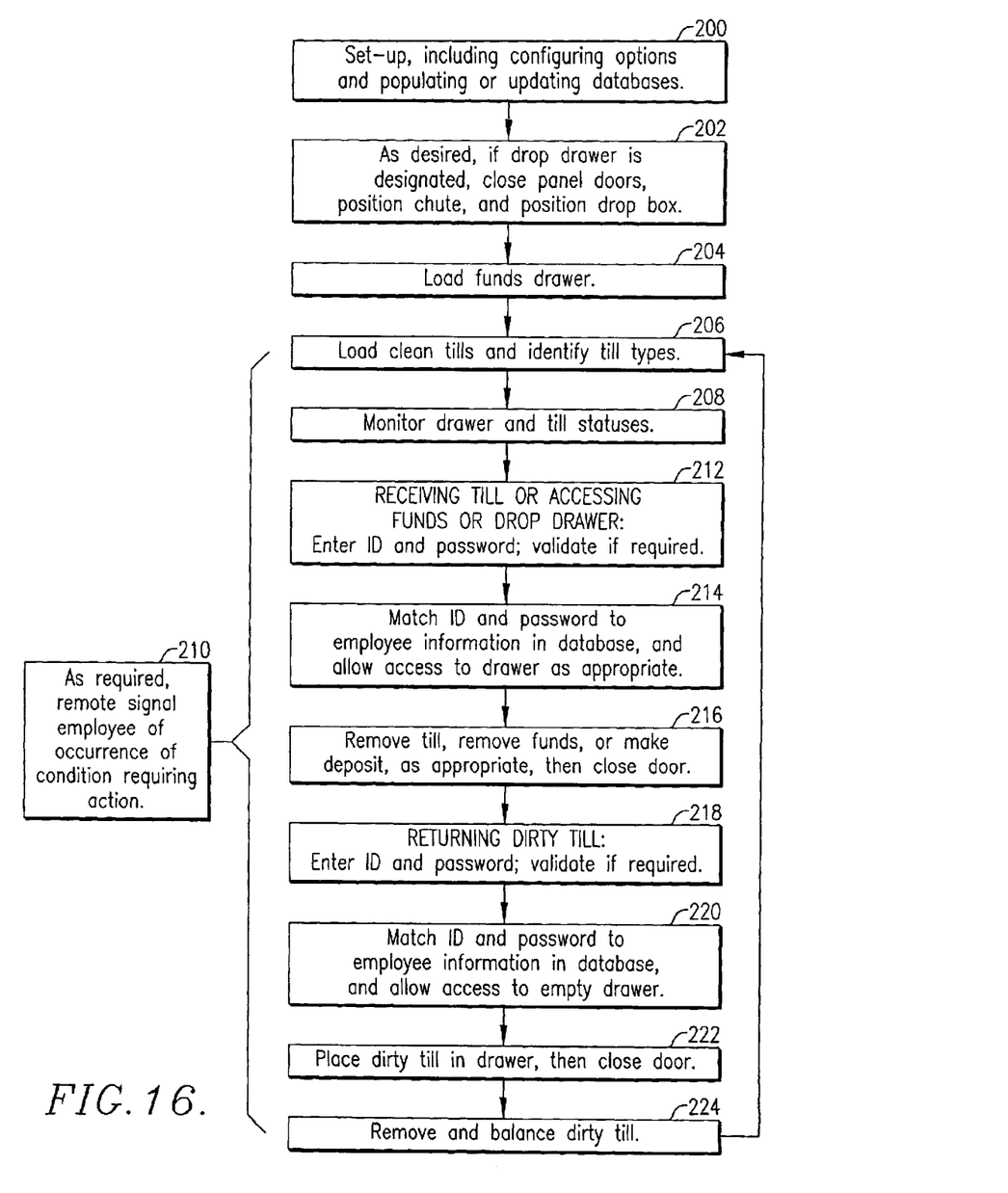
FIG. 16 is a flow diagram showing the operation of the system of FIGS. 1–3 as controlled by a preferred embodiment of the computer program of the present invention.

In operation, referring to FIG. 16, a progression of steps are shown which illustrate the general operation of the preferred system, described above, incorporating the preferred computer program, also described above, to monitor and manage the storage and distribution of money tills. Assuming that all hardware and software has been installed, connected, and is operating properly, the system and software must first be configured and databases populated or updated, as appropriate, as depicted in box 200. This step includes, for example, setting defaults; entering or updating employee information and authorizations; entering or updating messages; both business and personal; for display or printing; indicating which manager or other supervisor is authorized to access the funds compartment; and designating the drop compartment (if desired); as well as any other action required or desired prior to actual use of the system 20.

Only one compartment aligns with the drop slot 46 in the panel door 42 and is therefore operable to act as the drop compartment. Nevertheless, because the drop compartment function may only be desired under certain circumstances (e.g., at night), and because access protocols are different for the drop compartment, when the cash drop function is desired the computer 30 must be told to treat the appropriate compartment as a drop compartment. This may be part of the daily or beginning-of-shift system setup and configuration, or it may be done at any time during operation. If a drop compartment has been designated, it may be desirable at some point to close the panel doors 42,44 and position the chute 70 and drop box 72 (see FIG. 3) beneath the drop slot to catch deposits dropped therethrough, as is depicted in box 202.

The funds compartment 26 is not accessible from the rear and must be loaded from the front after the computer 30 has opened the door 40 of the funds compartment 26, as is depicted in box 204. Limiting the funds compartment 26 to frontal access facilitates transferring exclusive control and accountability of the funds to the designated employee. Once the funds compartment 26 is loaded, the compartment door 40 is closed.

Clean tills are loaded into the cabinet 22 from the rear, as is depicted in 206. If the computer 30 is provided with employee scheduling information, the computer 30 may be allowed to suggest till types and placement so as to accommodate anticipated till needs and the known heights of scheduled employees. Each till must be identified by type to the computer 30, which may be accomplished automatically, using a bar code scanner incorporated into each compartment 24 and operable to read a bar code affixed to each till, or by hand scanning, for each compartment, a bar code affixed to the compartment 24 and a bar code affixed to the till loaded therein.

Once clean tills have been loaded, cabinet and compartment statuses are monitored by and from the computer 30, as depicted in box 208. Visual and audible interfaces, such as, for example, graphical representations, computer-generated messages, and audible messages or tones, are also provided for benefit of a human operator. Monitoring includes tracking till needs and usage, and ensuring that compartment doors 40 are closed after the compartments 24 have been accessed.

If, at any time, a condition occurs requiring human attention, and the signaling option is enabled, the computer 30 will page or otherwise signal a designated employee that the condition has occurred, as is depicted in box 210. Such conditions could include, for example, the unavailability of a requested till type or the anticipated need for an unavailable till type.

A cashier needing a till, a manager needing funds, or an employee desiring to deposit excess cash approaches the control panel 28 and enters his or her identification and password, as is depicted in box 212. With regard to accessing the drop compartment, a common password is provided to all employees. Additionally, a validation step may be included requiring further identification of all or selected employees, possibly using one or more of the above described conventional or biometric input devices 68.

The entered identification and password data is sent from the control panel 28 to the computer 30 where it is matched to information stored in the databases, as is depicted in box 214. The computer 30 then checks or determines, among other things, the employee's authorization to receive tills, the appropriate till type (if the employee is authorized to receive more than one till type they will be prompted to indicate the desired type), and, where more than one till of that type is loaded, to consider the employee's height when choosing a compartment to open. As described above, where a requested till type is not available, a signal is sent communicating such to a remote designated employee. The employee identification step also allows the computer 30 to track the employee's time in receipt of the till.

Once the matching is complete and the computer is satisfied, it sends an actuation signal to the appropriate solenoid 52 to open the door 40 to the appropriate compartment 24,26 and allow access to the till, funds, or deposit slot therein. If the action is a drop deposit, the computer 30 will cause the control panel printer 66 to print an identifying slip which can be attached to the deposit.

As the case may be, the cashier removes the till, the manager removes funds or makes change as required, or the employee reaches through the drop compartment and inserts a deposit through the drop slot 46, as is depicted in box 216. The compartment door 40 is then manually closed. The computer 30 monitors the door's status and will display a message on the display 64 if the door 40 remains open beyond a pre-established period of time. In another embodiment, the computer can close the door 40 automatically.

A cashier returning a dirty till approaches the control panel 28 and enters his or her identification and password, as is depicted in box 218. Validation may again be required, as described above. The employee identification data is sent to the computer where it is again matched to the employee database, as is depicted in box 220. If no empty compartments 24 are available to receive the till, a signal will be sent communicating such. Where more than one empty compartment 24 is available, the computer 30 will consider the employee's height when designating a particular compartment 24. Once the computer 30 is satisfied, it sends an actuation signal to the appropriate solenoid 52 to open the door 40 to the appropriate compartment 24.

The computer 30 then instructs the control panel printer 66 to print one or more messages, a timeslip, and an identifying number. The timeslip indicates times the employee was in receipt of the till. The identifying number is placed in or on the till prior to placing the till in the compartment 24. The identifying number is useful where cash room employees pull dirty tills for counting without otherwise noting or recording the till-employee relationship.

The cashier places the till in the compartment 24 and closes the door 40, as depicted in box 222. In some applications or circumstances, the cashier contemplating continued accountability for and subsequent retrieval of the dirty till may place the till in an exclusive access, storage-only compartment 25 having selectively restrictable rear access. Ultimately, the till is returned to the cabinet 22 for storage pending removal for balancing, as depicted in box 224. After the dirty till is removed, a clean till is loaded, as depicted in box 206 and described above.

METHOD

Figure 17:
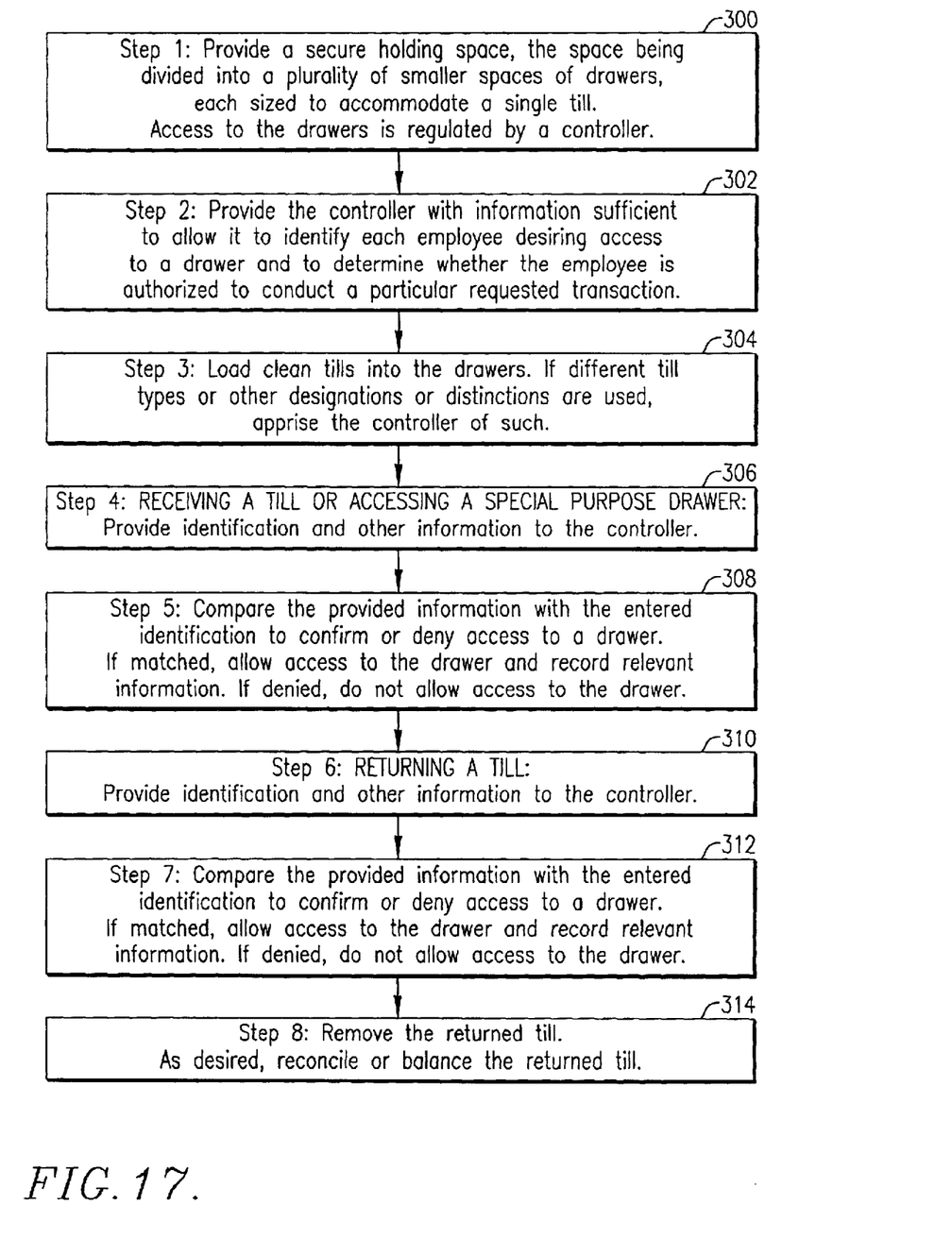
FIG. 17 is a flow diagram showing the steps in a preferred method of the present invention.

The above described system 20 and computer program may be more generally and broadly viewed as accomplishing a method of monitoring and managing storage and distribution of money tills. As will be appreciated by those with skill in the art, however, the method may be implemented using any hardware, software, or firmware or combination thereof, and is not limited to the system and software described herein. The preferred method broadly comprises eight steps, as shown in FIG. 17. Additional steps may be added as desired or needed to adapt the method to particular applications or circumstances without departing from the contemplated scope of the present invention.

In step 1, as depicted in box 300, a secure holding space is provided for storing the money tills. The holding space is divided into a plurality of smaller spaces or compartments, each sized to accommodate a single till. Access to each compartment is regulated by a controller.

In step 2, as depicted in box 302, the controller is provided with or has access to information sufficient to allow it to identify each employee desiring access to a compartment and to determine whether the employee is authorized to conduct a particular requested transaction.

In step 3, as depicted in box 304, clean tills are loaded into the compartments. If different till types or other designations or distinctions are used, the controller is apprised of such.

In step 4, as depicted in box 306, an employee desiring to receive a till from a compartment provides identification information to the controller and, if applicable, requests to perform a particular type of transaction.

In step 5, as depicted in box 308, the controller uses the entered identification and transaction data to confirm or deny the employee's authorization to access a compartment based upon the information provided to the controller in step 2, above. If confirmed, the controller allows access to the compartment and records relevant information, such as the employee's name, the time, and the till type, for subsequent recall and analysis. If denied, access to a compartment is not allowed.

In step 6, as depicted in box 310, an employee desiring to return a till to a compartment again provides identification information to the controller. In step 7, as depicted in box 312, the controller allows access to an empty compartment and adds to its record of relevant information, including the time of the return.

In step 8, as depicted in box 314, the dirty till is removed and a clean till is loaded in its place. The dirty till may be subsequently reconciled or balanced.

Although the invention has been described with reference to the preferred embodiment illustrated in the attached drawing figures, it is noted that equivalents may be employed and substitutions made herein without departing from the scope of the invention as recited in the claims. For example, those with skill in the art will appreciate that numerous different embodiments of hardware, software, firmware or combinations thereof exist for practicing the present invention. Accordingly, the present invention should not be viewed as limited to the particular illustrative embodiment shown and described.

Having thus described the preferred embodiment of the invention, what is claimed as new and desired to be protected by Letters Patent includes the following:

What is claimed is:

1. A system for controlling storage and distribution of money tills, the system comprising:
   a cabinet having a front side and a back side and substantially defining an interior space partitioned to provide a plurality of compartments, with each compartment operable to receive at least one of the money tills, the cabinet including
   a front opening allowing access from the front side of the cabinet to at least one of the compartments,
   a back opening allowing access from the back side of the cabinet to at least one of the compartments,
   a plurality of doors hingedly mounted to the cabinet, with each door operable to open and close and thereby restrict access to a corresponding one of the compartments;
   at least one input device operable to accept input; and
   a computer coupled with the input device and with each door and operable to control access to the compartments by receiving the input and comparing the input to stored information to generate one of a plurality of possible comparison results and, upon generating at least a particular one of the comparison results, to open at least one of the doors.

2. The system as set forth in claim 1, the cabinet further comprising one or more rear doors hingedly mounted to the back side of the cabinet and lockable so to selectively restrict access to the compartments through the back opening.

3. The system as set forth in claim 1, at least one of the compartments being accessible only through the front opening.

4. The system as set forth in claim 1, at least one of the compartments including a presence sensor for detecting a presence of the money till received within the compartment and reporting the presence to the computer.

5. The system as set forth in claim 1, each money till being of a type, at least one of the compartments including a type sensor for detecting the type of the money till received within the compartment and reporting the type to the computer.

6. The system as set forth in claim 5, the type sensor being a bar code reader operable to determine the type from a bar code affixed to the money till.

7. The system as set forth in claim 1, the system further comprising a handheld bar code reader operable to read information from a bar code affixed to each compartment and a bar code affixed to each money till and to report the information to the computer.

8. The system as set forth in claim 1, the cabinet further comprising one or more visual display devices mounted to the back side of the cabinet and operable to visually communicate a status of the compartment and a status of the money till received within the compartment.

9. The system as set forth in claim 1, the input device being selected from the group consisting of keypads, keyboards, fingerprint readers, card readers, retina scanners, voice identifiers.

10. The system as set forth in claim 1, the system further comprising a visual display viewable from the front side of the cabinet and controlled by the computer to visually communicate information.

11. The system as set forth in claim 1, the system further comprising a printing device accessible from the front side of the cabinet and controlled by the computer to print messages.

12. The system as set forth in claim 1, the computer being further operable to graphically communicate information regarding a status of the compartment and a status of the money till received within the compartment.

13. The system as set forth in claim 1, the input including information sufficient to identify a particular employee, the computer being operable to record and store the input for subsequent recall.

14. The system as set forth in claim 1, the system further comprising a portable electronic signaling device useable by the computer to signal to a person that a condition has occurred.

15. The system as set forth in claim 14, the electronic remote signaling device being a pager.

16. The system as set forth in claim 1, the system further comprising at least one camera positioned to view the front side of the cabinet, the camera being electrically connected to a recording device operable to record the view of the camera.

17. The system as set forth in claim 16, the recording device being a video cassette recorder.

18. The system as set forth in claim 16, the recording device being the computer.

19. The system as set forth in claim 1, the cabinet being mounted through a wall so as to present the front side to a first area defined by the wall and to present the back side to a second area defined by the wall.

20. Source code for execution by a control component of a system for controlling storage and distribution of money tills, the system comprising at least one compartment operable to receive at least one of the money tills, and at least one input device operable to accept input, and the control component being coupled with the compartment and the input device and operable to control access to the compartment, the source code comprising:

a first code segment operable to receive and store employee information, including authorization information;

a second code segment operable to receive and store compartment status information and money till information;

a third code segment operable to receive the input and compare the input to the stored employee information and stored compartment status and money till information to produce a comparison result;

and a fourth code segment operable to control access to the compartment based upon the comparison result.

21. The source code as set forth in claim 20, the fourth code segment being operable to send signals to an opening mechanism of a compartment door to cause the door to open and allow access to the compartment.

22. The source code as set forth in claim 20, the compartment having a status and the money till having a type, the source code further comprising a fifth code segment operable to receive and cause to be graphically displayed the status of the compartment and type of the money till.

23. The source code as set forth in claim 20, further including a sixth code segment operable to detect and graphically communicate the occurrence of a condition.

24. The source code as set forth in claim 23, further comprising a seventh code segment operable to generate signals to audibly communicate the occurrence of the condition.

25. The source code as set forth in claim 23, further including an eighth code segment operable to generate signals to communicate via a portable electronic signaling device the occurrence of the condition.

* * * * *